(12) United States Patent
Fiordilino et al.

(10) Patent No.: US 11,175,180 B2
(45) Date of Patent: Nov. 16, 2021

(54) HIGH ENERGY POWER MEASUREMENT SYSTEMS AND METHODS

(71) Applicant: The United States of America, as represented by the Secretary of the Navy, Crane, IN (US)

(72) Inventors: Joseph A. Fiordilino, Pittsburgh, PA (US); Subrata Sanyal, Eastvale, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 778 days.

(21) Appl. No.: 16/008,264

(22) Filed: Jun. 14, 2018

(65) Prior Publication Data

US 2019/0137335 A1    May 9, 2019

Related U.S. Application Data

(60) Provisional application No. 62/519,337, filed on Jun. 14, 2017.

(51) Int. Cl.
*G01J 1/56* (2006.01)
*G01K 17/00* (2006.01)
(Continued)

(52) U.S. Cl.
CPC ............. *G01J 1/56* (2013.01); *G01J 1/0252* (2013.01); *G01J 1/0437* (2013.01); *G01K 17/003* (2013.01)

(58) Field of Classification Search
CPC ........ G01J 2001/4247; G01J 1/56; G01J 1/42; G01J 1/4257; G01J 1/50; G01J 1/58; F16F 15/022; G01M 11/00; G05B 2219/49048; G05B 2219/49054; H01S 3/0014; H01S 3/0401
(Continued)

(56) References Cited

U.S. PATENT DOCUMENTS 5,166,504 A * 11/1992 Protz ..................... B23K 26/04
                                                          250/201.1
5,475,851 A    12/1995 Kodosky et al.
(Continued)

OTHER PUBLICATIONS

Smith, R. L. Smith, T. W. Russell, W. E. Case, and A. L. Rasmussen, Calorimeter for High-Power CW Lasers, IEEE Trans. Instrum. Meas., 21 (1972), pp. 434-438).
(Continued)

*Primary Examiner* — Hoa Q Pham
(74) *Attorney, Agent, or Firm* — Naval Surface Warfare Center, Crane Division; Christopher A. Monsey (57) ABSTRACT

The present invention relates to an optical energy meter. Illustrative embodiments of the present disclosure include a system controller, temperature sensing system, vibration sensing system, torque sensing system, graphical display system, climate control system, and vibration control system. The invention measures the radiation pressure of incident high power electromagnetic radiation. The measurement of radiation pressure can be used to determine the power of the radiation; that is, the purposes of the invention are to measure, with high precision and accuracy, and survive the power of an incident high power electromagnetic beam while minimizing size, weight, and power requirements.

11 Claims, 8 Drawing Sheets

(51) Int. Cl.
*G01J 1/02* (2006.01)
*G01J 1/04* (2006.01)

(58) Field of Classification Search
USPC .......................... 356/213–218, 445; 250/216
See application file for complete search history.

(56) References Cited

U.S. PATENT DOCUMENTS

| | | |
|---|---|---|
| 6,823,283 B2 | 11/2004 | Steger et al. |
| 9,625,313 B2 | 4/2017 | Lehman et al. |
| 2012/0051378 A1* | 3/2012 | Kar .......................... G01J 1/42 |
| | | 372/38.01 |
| 2013/0328253 A1 | 12/2013 | Kraner et al. |
| 2014/0307253 A1 | 10/2014 | Lehman et al. |
| 2019/0103820 A1* | 4/2019 | Fiordilino ............... G01M 7/00 |

OTHER PUBLICATIONS

Hadler, NIST Measurement Services: cw Laser Power and Energy Calibrations at NIST, NIST Special Publication, 2007, vol. 250-275.

* cited by examiner

Fig. 1

PERSPECTIVE REAR VIEW

Fig. 2

SIDE VIEW
Fig. 3

BOTTOM VIEW
Fig. 4

CROSS SECTION TOP VIEW
Fig. 5

HIGH ENERGY POWER MEASUREMENT SYSTEMS AND METHODS

CROSS-REFERENCE TO RELATED APPLICATIONS

The present application claims priority to U.S. Provisional Patent Application Ser. No. 62/519,337, filed Jun. 14, 2017, entitled "A HIGH ENERGY LASER POWER MEASUREMENT SYSTEM ADAPTED TO PROVIDE HIGHLY ACCURATE DELIVERED POWER MEASUREMENTS ON A TARGET WHICH IS REUSABLE AND NON-DISPOSABLE THAT MINIMIZES SIZE, WEIGHT, AND POWER CONSUMPTION AND HAS EFFECTIVE THERMAL AND VIBRATION MANAGEMENT," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,441) is assigned to the United States Government and is available for licensing for commercial purposes. Licensing and technical inquiries may be directed to the Technology Transfer Office, NSWC Corona Division, email: CRNA_CTO@navy.mil.

BACKGROUND AND SUMMARY OF THE INVENTION

The present invention relates to a high energy measurement system using an optical energy meter. Exemplary embodiments measure radiation pressure of an incident high power electromagnetic (EM) beam with rectilinear propagation properties (e.g., high energy lasers, or high energy directed EM radiation). Measurements of radiation pressure can be used to determine the power of an EM beam such that embodiments can measure and survive transferred heat from an incident high power EM beam.

A variety of different apparatus are used to measure the power of incident EM radiation. These include: calorimeters (e.g., Smith, R. L. Smith, T. W. Russell, W. E. Case, and A. L. Rasmussen, Calorimeter for High-Power CW Lasers, IEEE Trans. Instrum. Meas., 21 (1972), pp. 434-438), thermopile sensors (e.g., Hadler, NIST Measurement Services: cw Laser Power and Energy Calibrations at NIST, NIST Special Publication, 2007, Vol. 250-275), and balance-derived radiation-pressure meter systems (e.g., Williams US Patent App. 20140307253). In a high power regime, an EM beam is meant to melt and destroy the target. Consequently, survivability and reusability of an energy measurement system is paramount in this regime. Current existing apparatus designed to deal with high power EM beams suffer from large size, weight, and power consumption (SWAP) requirements or are especially susceptible to corruptive disruptive forces.

Calorimeters and thermopile sensors work on a fundamentally different principle than balance-derived optical meters. They attempt to fully absorb the energy of the incident EM beam and calculate power based on a temperature difference induced by this absorption. Consequently, as the energy of incident EM radiation increases, these devices heat up and require cooling systems, e.g., water cooling. These high power EM radiation measurement devices suffer from slow response times (in the absence of cooling), become bulky, and have increasingly low portability when cooling is required.

Balance-derived radiation-pressure meter systems are a recent development. These devices measure energy of an incident EM beam through radiation pressure. However, such devices use balance systems, e.g., spring-loaded mass balance, and are consequently susceptible to vibration pollution; that is, vibrations can induce significant false sources of pressure on balance systems leading to increased uncertainty in accuracy of measurements of radiation pressure. If one tests in a high vibration environment, this may render a system completely unreliable. Consequently, such systems may be susceptible to environmental effects which induce vibrations such as wind. Furthermore, incident electromagnetic radiation can heat up air near a reflector which causes vibration pollution.

Exemplary embodiments measure power of an incident high power EM emission via radiation pressure on an ellipsoid resulting in torque which rotates the ellipsoid. A variety of different systems are put into place to ensure survival of an apparatus while maintaining low SWAP requirements. An EM beam can impact and impart a torque onto a reflective ellipsoid; in particular, an incident EM beam can apply a force on one half of the ellipsoid. A twistable rod can restrict rotation of the ellipsoid about a single axis perpendicular to the incident EM radiation. Torque can be generated from a portion of induced force tangential to an outer surface of the ellipsoid. A torque sensor 115 such as a transducer, for instance, can register induced torque and transmit a signal. The system controller, which is connected to the torque sensor 115, receives the signal and performs a calculation that converts this measurement into a force and, therefore, power of the incident EM beam.

Additional exemplary embodiments measure the power of an incident high power EM emission via radiation pressure inducing a voltage. An EM beam can impact and impart a force onto a reflective plate. The reflective plate can be in contact with or act as a force member. A force member can transfer force to a piezoelectric material or sensor/transducer (PT) so that the PT can register a mechanical stress. The mechanical stress induces a voltage difference across a piezoelectric material layer which, in turn, induces an electric current. A system controller, which is connected to the PT, can receive the electric current or a signal created by the electric current and can perform a calculation that converts a measurement of the electric current into a force and therefore power of the incident EM beam.

Exemplary embodiments have a reduced size and weight compared to conventional calorimeters. Consequently, exemplary embodiments can be more portable than conventional calorimeters. Another advantage of exemplary embodiments over conventional calorimeters is the ability to use EM beams while simultaneously measuring and possibly controlling direction of reflected EM beams.

Further, using a reflective ellipsoid to measure radiation-pressure removes the need for additional moving parts, seen in spring and alternative torsion balance derived systems, allowing embodiments to be resistant to damage caused in operational environments and easier to maintain. Another advantage occurs in measurement processes, wherein exemplary embodiments are naturally resistant to vibration pollution in the measurement process while balance derived systems, which utilize springs and associated necessary infrastructure, are subject to significant amounts of vibration pollution during emission measurements.

In summary, exemplary embodiments can have similar or better accuracy and fidelity compared to current mass-balance or torsion-balance radiation-pressure measurement systems due to intrinsic vibration isolation. Embodiments can be highly portable due to minimization of moving parts, low weight, and small size. Embodiments can be easy to use, requiring no extra hookups to bulky cooling systems. The minimization of moving parts promotes resistance to regular wear and tear.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
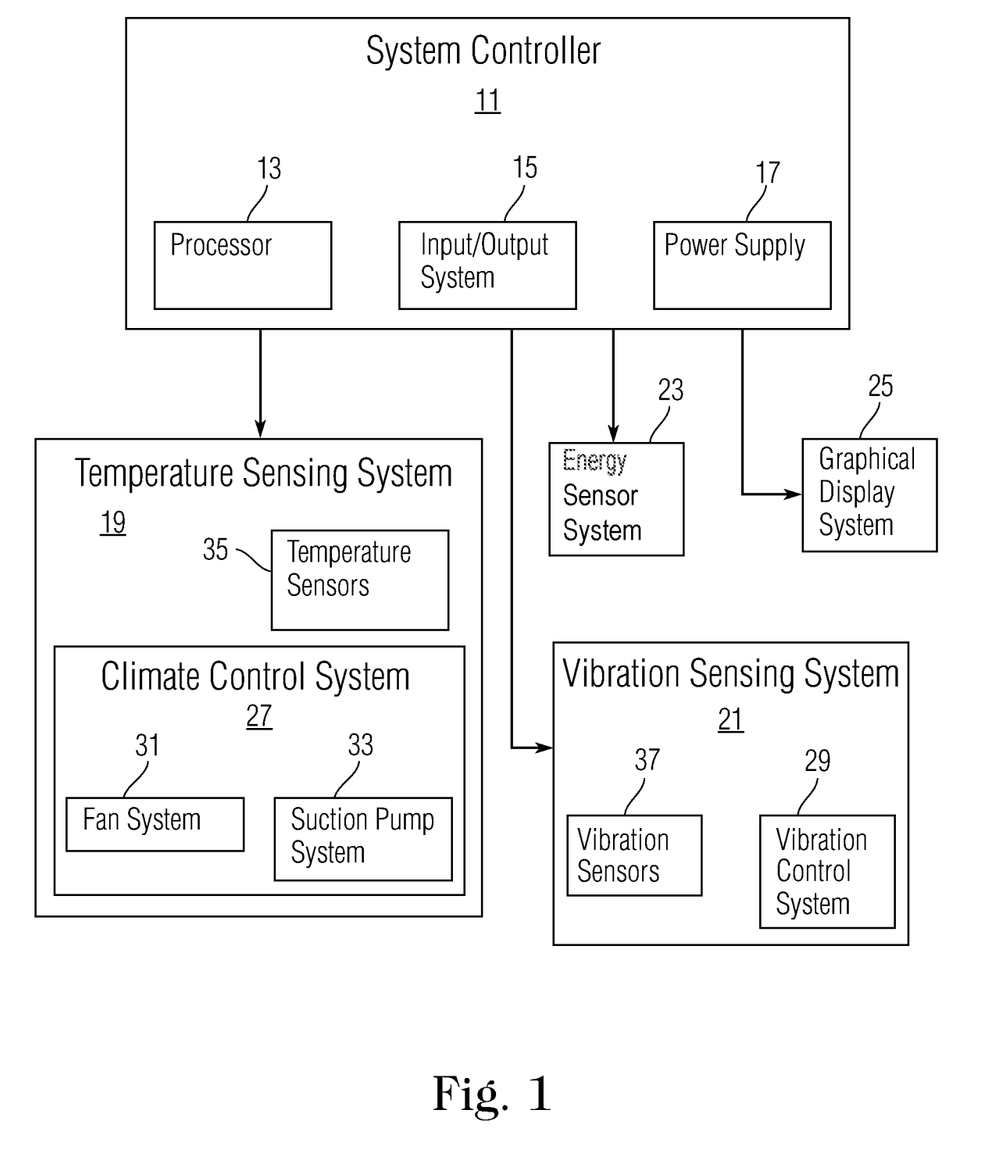
FIG. 1 shows an exemplary system architecture illustrating the connections between the system controller and other system components.

FIG. 1 shows an exemplary system architecture corresponding to an embodiment of the invention containing a system controller 11, temperature sensing system 19, vibration sensing system 21, energy sensor system 23, graphical display system 25, climate control system 27, and vibration control system 29. The system controller 11 includes a processor 13, Input/Output (I/O) system 15, and power supply 17. The system controller 11 is electronically coupled to the energy sensor system 12 and interacts with other system components, performs calculations, and allows for interaction with external systems through an I/O system 15. For instance, during operation, an energy sensor system 23, such as a torque sensing system including a torque sensor 115 (see FIG. 6C) can send a data stream to the system controller 11 which can process this data stream (e.g., calculate the power of a EM beam 103 (see FIG. 6A) and utilize I/O system 15 to interact with a laptop or computer to visualize and record the data. Examples of system controllers can include microcontrollers (e.g., a PIC microcontroller), single-board computers (e.g., Raspberry Pi Foundations' Raspberry Pi), and embedded controllers (e.g., National Instruments' CompactRIO Controller, see U.S. Pat. No. 6,823,283 and related). Software needed to operate a system controller can be implemented in numerous ways including developed proprietary software pertinent to a microcontroller or National Instruments' LabVIEW based software (U.S. Pat. No. 5,475,851 and related). In an alternative exemplary embodiment, a energy sensor system 23 can be replaced by a radiation pressure sensing system (e.g., a reflective plate connected to a PT).

A temperature sensing system 19 can include a plurality of temperature sensors 35, such as thermistors or thermocouples, placed at strategic points within the system (e.g., on a heat absorbing shield 131 (see FIG. 9) placed near an ellipsoid 101, near electronic components). The use of high energy EM beams 103 can cause large increases in temperature within a testing system. Sufficiently high temperatures can reduce the fidelity of the measurement of EM beam 103 power or damage system components. The temperature sensing system 19 can supply temperature data to the system controller 11, which can interact with the climate control system 27 to provide a response if a predetermined temperature threshold is met. In an exemplary embodiment, when the temperature sensing system 19 detects a predetermined temperature on an absorbing shield, the system controller 11 can transmit a signal to a climate control system 27, which can activate or speed up a fan 133 (see FIG. 10A) or suction pump within a fan system 31 or suction pump system 33.

A vibration sensing system 21 can include a plurality of vibration sensors 37, such as geophones and accelerometers, placed at strategic points within the system (e.g., within a energy sensor system 23). Sufficiently strong perturbations (or vibrations) acting on or within the invention may act to reduce the fidelity of the measurement of EM beam gzaz103 power. The vibration sensors 37 can detect perturbations and relay this information to the system controller 11. The system controller 11 can then interact with the vibration control system 29 to provide a response if a predetermined vibration threshold is met. For example, the vibration sensing system 21 can detect perturbations coming from below the invention through the bottom end of the stabilizing rod 117. In response, the system controller 11 can send a signal to the vibration control system 29 to initiate a response to dampen the perturbations to preserve the fidelity of the power measurement.

Figure 2:
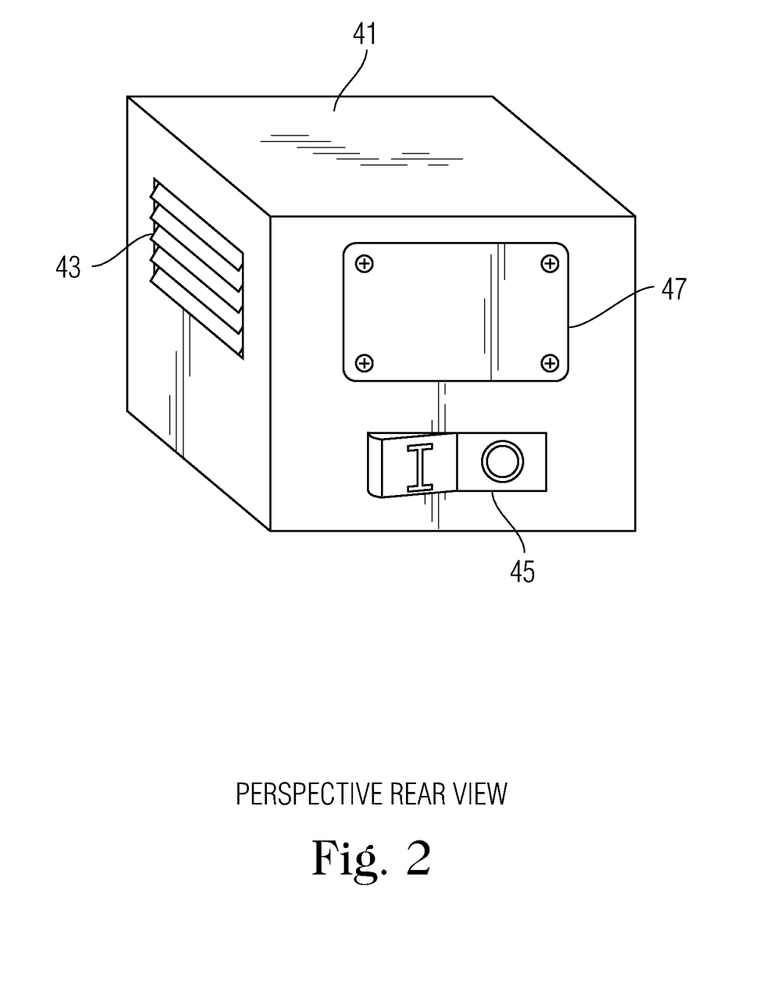
FIG. 2 shows a perspective rear view of an exemplary case including an exhaust outlet/ventilation inlet, (removable) access panel, and input/output panel.

FIG. 2 shows a perspective rear view of an exemplary case 41 of a measurement system. A case 41 can connect to various components to provide structural support to the system and can also prevent external forces from acting upon system components. The case 41 can include an exhaust outlet 43 (or ventilation inlet) on any face of the case to facilitate air flow entering or exiting the interior of the case. An exhaust outlet 43 can include filters and grilles to restrict entrance and facilitate air flow. An exhaust outlet 43 can also include a fan 133 or suction pump controlled by a climate control system 27 to draw cool air into the case 41 or draw hot air out of the case 41. An I/O panel 45 can allow for interaction between an I/O system 15 and an external system such as a laptop or computer to facilitate control of the invention (e.g., over a wired or Wi-Fi connection) using existing or manufactured software. Additionally, the I/O panel 45 can facilitate offloading of data to an external hard drive through a wired or wireless connection. A removable panel 47 can allow access to the interior of the case 41 and internal system components to facilitate the ability to manufacture, repair, replace, and reconfigure system components. In alternative embodiments, additional portions of a case 41 can be removed or be removable such that openings in the case 41 can be formed to allow hot air to exit the case 41.

Figure 3:
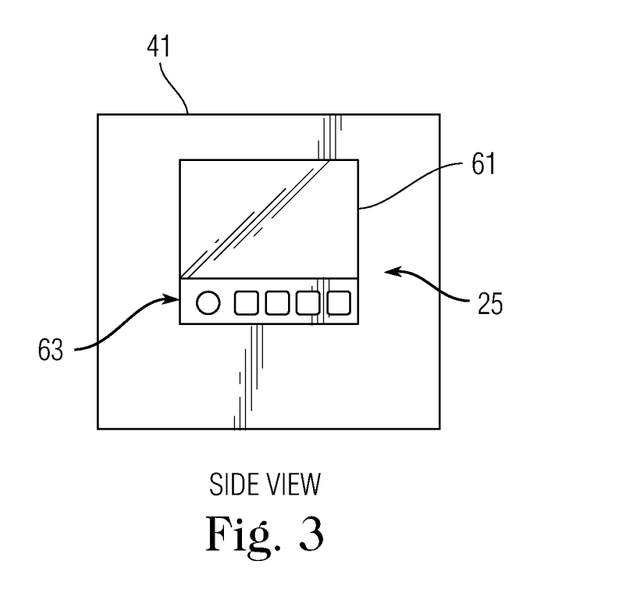
FIG. 3 shows a side view of an exemplary case illustrating the graphical display system.

FIG. 3 shows an exemplary graphical display system 25 on the side of a case 41. The graphical display system 25 can include a visual display unit 61 allowing for the power reading of an EM beam 103 to be visualized through numeric or graphical means. Further, settings may be adjusted utilizing control panel 63; for instance, the particular measurement unit may be adjusted from watts (W) to kilowatts (kW) or the frequency of data processing, e.g., calculate power every millisecond (ms) or second (s). The graphical display system 25, through the use of software, allows for the visualization of data and facilitates interaction between the operator of the invention and the system controller 11, e.g., changing settings via physical interaction with the control panel 63.

Figure 4:
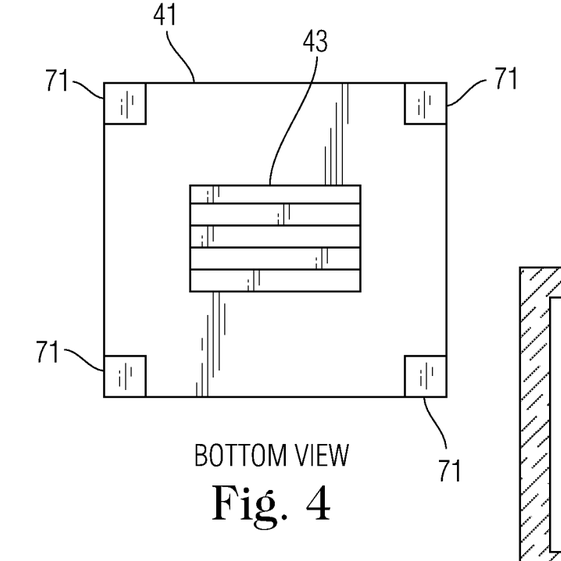
FIG. 4 shows a bottom view of an exemplary embodiment including a ventilation panel and vibration absorbing stands.

FIG. 4 shows a bottom side view of an exemplary case 41 with an exhaust outlet 43 on the bottom of the case 41. Vibration absorbing stands 71, e.g., rubber or pneumatic isolators, can be used to elevate and stabilize the case 41 and to dampen unwanted perturbations originating from environmental conditions (e.g., a workbench, earth, etc.).

Figure 5:
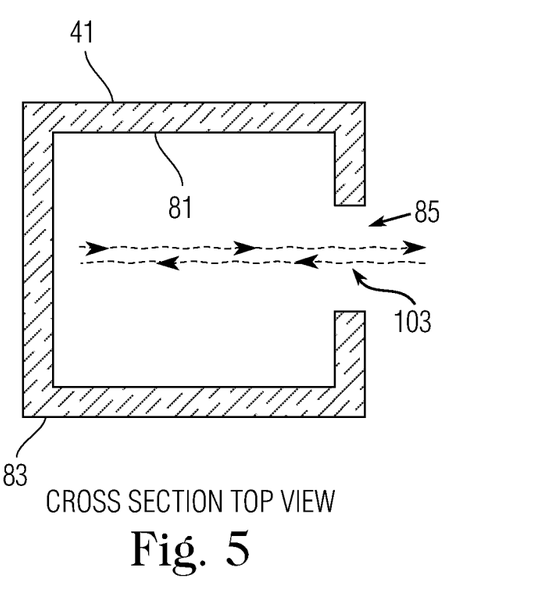
FIG. 5 shows a cross-sectional top view of an exemplary embodiment illustrating the structure of a container.

FIG. 5 shows a cross-sectional view of an exemplary case 41 corresponding to an embodiment of the invention. The case 41 has an inner wall 81 and outer wall 83. A first opening 85 in the case 41 can allow an EM beam 103 to enter or exit the case 41. The case 41 can be made of thermal and vibration insulation materials (e.g., polyurethane foam and rubber sponge) or can include layers of these materials between the walls 81, 83. The thermal and vibration insulation materials can passively support the climate control system 27 and vibration control system 29 to prevent heat damage and unwanted perturbations. The thermal insulation materials can protect sensitive components (e.g., a torque sensor 115, vibration insulation materials, and electronic components) from conductive heat transfer and allow a person to move or touch the measurement system without burning oneself. Moreover, components such as sensors and electronic wiring can be placed within the region separating the two walls protecting both them and torque sensing components from possibly deleterious interactions (e.g., an EM source and a strong external force). In some embodiments, thermal insulation materials can be limited to areas near heat sensitive components (e.g., electronics). Additionally, an inner wall 81 can be coated with anti-reflective products or materials, such as optical black coatings (e.g., NanoLab's Singularity Black), to improve measurement accuracy by absorbing EM radiation which could otherwise impact an ellipsoid 101 or reflective plate 167.

Figure 6A:
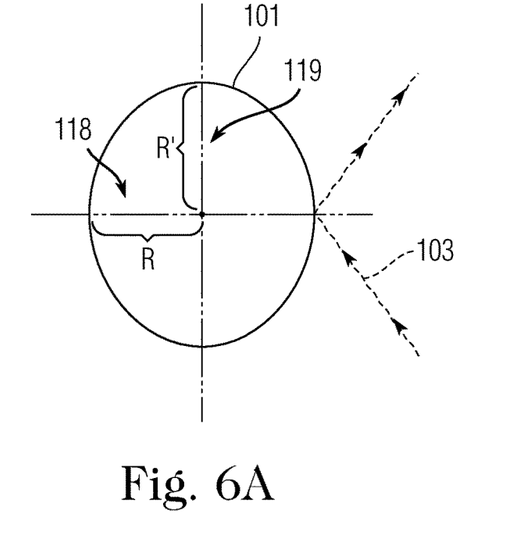
FIG. 6A shows a cross-sectional top view of an exemplary reflective ellipsoid body reflecting an EM beam.
Figure 6B:
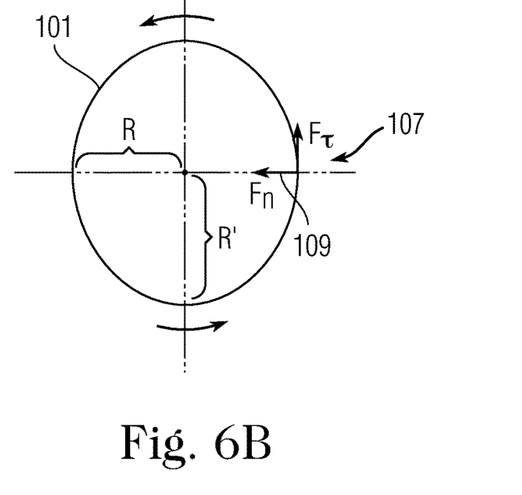
FIG. 6B shows a cross-sectional top view of an exemplary reflective ellipsoid body with exemplary rotation forces.

FIG. 6A shows a top down view of an EM beam 103 impacting an ellipsoid 101 at an oblique angle and reflecting off of the ellipsoid 101 at an oblique angle. An ellipsoid 101 can be constructed from an ellipsoidal body with lightweight materials (e.g., carbon fiber, nanostructured ceramics, treated foam) and a reflective coating (e.g., silvering). A layer of thermal insulation (e.g., ceramic coating) may be inserted between the reflective coating and the ellipsoid body to protect the reflective ellipsoid 101 from thermal distortion. An ellipsoid 101 has a first axis 118, a second axis 119, and a third axis 120. The three axes 118, 119, 120 are mutually orthogonal and pass through an origin of the ellipsoid 101. The ellipsoid 101 can be a sphere (e.g., all three axes have equal length), an oblate spheroid (e.g., first and third axes have equal length and are longer than the second axis), a prolate spheroid, a tri-axial ellipsoid (e.g., all three axes have different lengths), or other combinations of axis lengths. When an EM beam 103 impacts an ellipsoid 101, part of the EM beam 103 reflects off of the ellipsoid 101 while another part is absorbed by the ellipsoid 101. This absorption induces a first force 107 that is tangential to the surface of the ellipsoid 101 and a second force 109 that is normal to the surface of the ellipsoid 101, as shown in FIG. 6B. The first force 107 is responsible for inducing a torque on the ellipsoid 101, which causes the ellipsoid 101 to rotate about a fixed axis. Different ellipsoid shapes can be used to create different reflection spreads of an EM beam 103 (e.g., an oblate spheroid rotating about one of the axes of equal length can reduce horizontal beam spread and increase vertical beam spread).

Figure 6C:
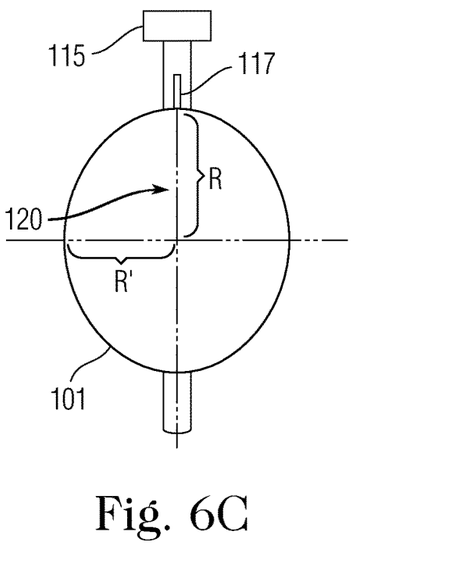
FIG. 6C shows a cross-sectional side view of an exemplary torque measurement system with a stabilizing rod connecting an ellipsoid body to a torque measurement system.
Figure 6D:
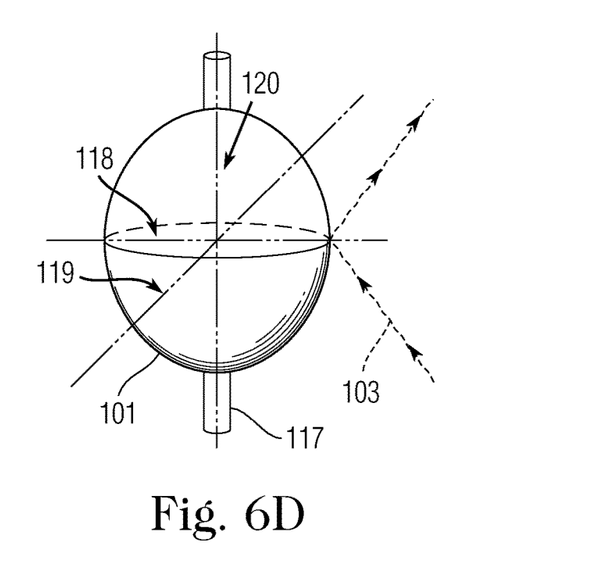
FIG. 6D shows a perspective view of an exemplary torque ellipsoid body reflecting an incident EM beam.

FIG. 6C shows an exemplary torque sensor 115 connected to an ellipsoid 101 by a stabilizing rod 117. A stabilizing rod 117 can restrict the rotation of the ellipsoid 101 about a third axis 120 which is perpendicular to the incident EM beam 103. A torque sensor 115 can be connected to a first end of the stabilizing rod 117 to register induced torque when the ellipsoid 101 rotates and record torque data. The torque sensor 115 can relay torque data to a system controller 11 to calculate the power of the EM beam 103. A torque sensor 115, which is attached to the case, can restrict rotational motion until a signal from the system controller 11 is given. A second end of the stabilizing rod 117 can rest in a recess on the inner wall 81 of the case, or a vibration isolator (e.g., a rubber isolator) can be placed between the second end of the stabilizing rod 117 and the inner wall 81 of the case. Alternatively, the second end of the stabilizing rod 117 can be connected to an additional torque sensor. FIG. 6D shows a perspective view of an ellipsoid 101 being impacted by an EM beam 103 while a stabilizing rod 117 restricts movement of the ellipsoid 101 along a third axis 120 while allowing movement along a first axis 118 and a second axis 119.

Figure 7:
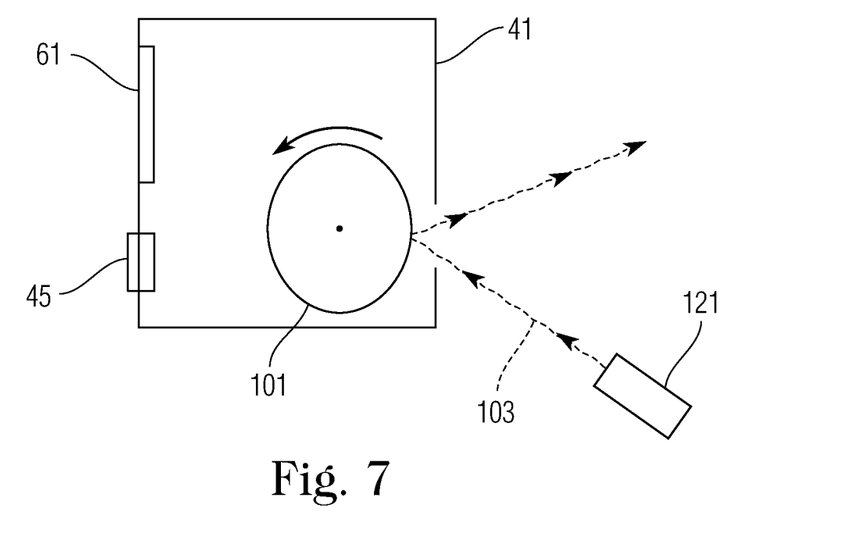
FIG. 7 shows a perspective rear view of an exemplary embodiment including a ventilation panel, access panel, and input/output panel.

FIG. 7 shows a cross-sectional top view of an ellipsoid 101 inside of a case 41. An EM source 121 can direct an EM beam 103 towards a case 41. The EM beam 103 impacts the ellipsoid 101 within the case 41 to generate torque on the ellipsoid 101. The system controller 11 is able to calculate the power of this EM beam 103 using the data gathered from the energy sensor system 23 and offload the calculation (data) to an external system for visualization and recording utilizing the I/O panel 45 corresponding to the I/O system 15. The data may also be displayed using the visual display unit 61 of the graphical display system 25.

Figure 8:
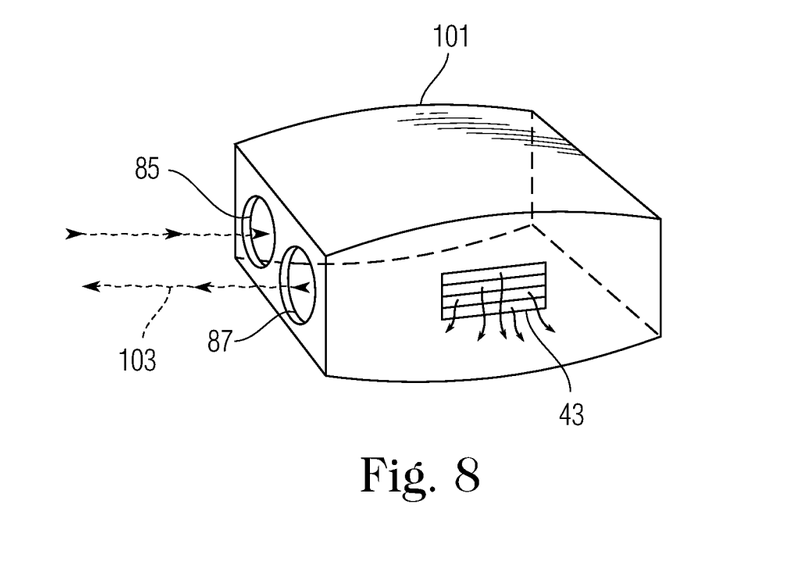
FIG. 8 shows an exemplary container having an aerodynamic shape with apertures for incoming and outgoing EM beams to enter the container and a ventilation panel.

FIG. 8 shows a perspective external side view of an exemplary case 41. A case 41 may be formed to be aerodynamic (e.g., using rounded surfaces). This form can reduce perturbations of a case 41 induced by the local atmosphere (e.g., wind) by limiting the amount of energy transferred to the case 41. In addition, a case 41 can include exhaust outlets 43 containing vents or grilles with "shark gill" like appearance, which facilitate outflow of hot air from the interior of the case 41 to the local atmosphere and away from the case 41. At least one opening is needed in a front side of the case 41 to allow an EM beam 103 to enter and exit the case 41. In an exemplary embodiment, as shown in FIG. 8, a first opening 85 can allow an EM beam 103 to enter the case and impact the reflective ellipsoid 101 and a second opening 87 can allow the EM beam 103 to exit the case 41 for use or extinction of the EM beam 103. The at least one opening can be fitted with optical windows constructed of transparent materials, such as glass, allowing for passage of the EM beam 103 into and out of the case; lensing effects can be induced by such optical windows.

Figure 9:
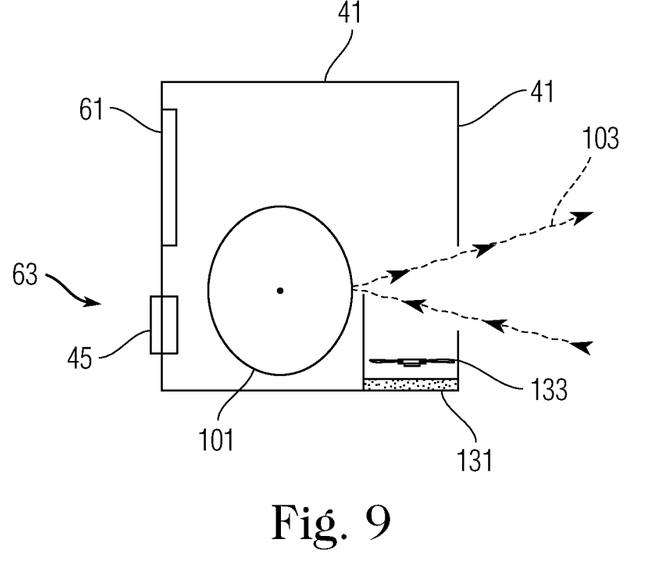
FIG. 9 shows a cross-sectional top view of an exemplary embodiment including a beam shield and shield cooling fan.

FIG. 9 shows an exemplary embodiment of the invention including a shield 131. A shield 131 can be placed between the reflective ellipsoid 101 and an EM beam 103. If an EM beam 103 strikes the reflective ellipsoid 101 on both the first and second half of the exposed side, the EM beam 103 will corrupt the measurement by applying force in opposing directions such that a measured torque will not reflect the true value of the force imparted by the EM beam 103. The shield 131 acts to absorb and/or dissipate the incoming EM beam 103 which does not land on the first half of the ellipsoid 101 to maintain the fidelity of the measurement. In principle, the shield 131 may be made up of materials which are conducive to data gathering; that is, the shield 131 may be made up of a pyroelectric material, such as Lithium tantalate (LiTaO$_3$), which generates a voltage difference when heated or cooled. A voltage difference induces a current which can be measured and a calculation made, using the system controller 11, to convert the reading into a power. This power measurement can be used to adjust the torque based power measurement; that is, the shield 131 can be used like a calorimeter to increase the fidelity of the power measurement. A fan 133 can be placed between the shield 131 and the front of the case 41. The fan 133 can draw heated air out of the case 41, maintaining the fidelity of the measurement.

Figure 10A:
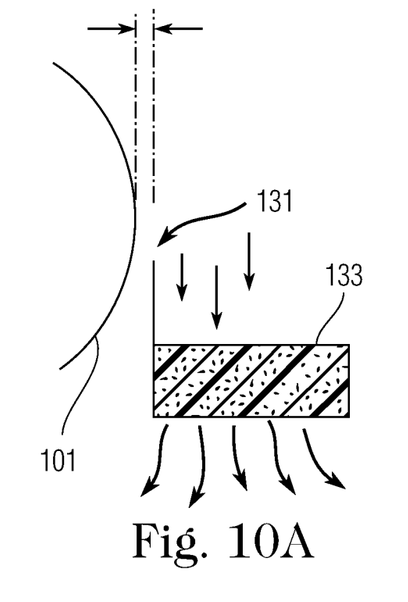
FIG. 10A shows an exemplary beam shield and shield cooling fan with an exemplary air flow path.
Figure 10B:
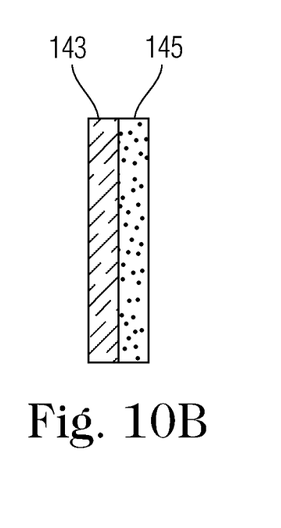
FIG. 10B shows an exemplary beam shield design.
Figure 10C:
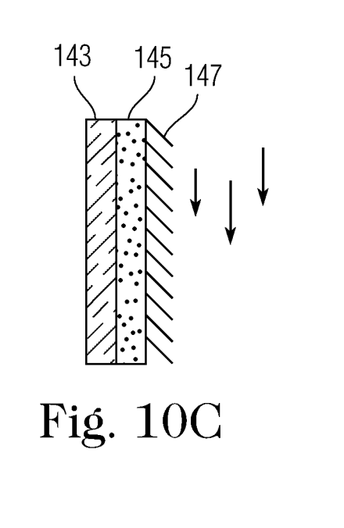
FIG. 10C shows another exemplary beam shield design including fin structures.

FIG. 10A-C show exemplary shield 131 embodiments. As shown in FIGS. 10B and 10C, a shield 131 can include an insulating layer 143 and absorptive layer 145. An insulating layer 143 can prevent heat from transferring nearer to the reflective ellipsoid 101 and possibly affecting the fidelity of the measurement. An absorptive layer 145 can prevent EM radiation from reflecting off of the shield 131 which could otherwise reduce the accuracy of measurement. As shown in FIG. 10C, fins 147 can be added to the shield 131, acting as a heat sink, to aid in the dissipation of heat. Moreover, the hotter air can be carried out of the case through the climate control system's 27 active system, including a low vibration fan 133, a suction pump system, or low SWAP water cooling, or passive systems, including exhaust outlets.

Figure 11A:
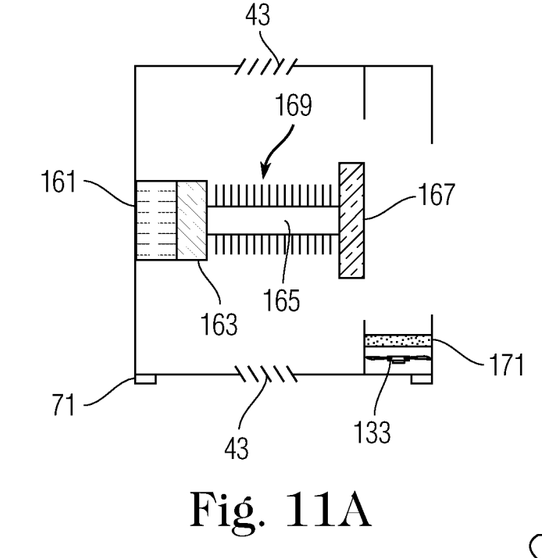
FIG. 11A shows a cross-sectional side view of an exemplary system.

FIG. 11A shows a cross-sectional side view of an exemplary measurement system including a radiation pressure system. A radiation pressure system can include a reflective plate 167, force member 165, insulating layer 163, and PT 161, which can be imbedded within the case 41. The force member 165 can include fins 169 to dissipate heat generated by the interaction between an EM beam 103 and the reflective plate 167. Moreover, a low vibration fan 133 is exhibited which may act to draw out hot air from within the case 41. Exhaust outlets 43 (ventilation inlets) are featured as well which can act to allow hot air to escape from within the case 41.

Figure 11B:
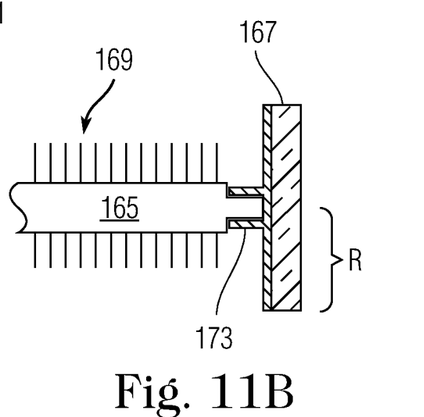
FIG. 11B shows a cross-sectional side view of an exemplary reflective plate and force member.

FIG. 11B shows a detailed view of a force member 165 and reflective plate 167. A force member 165 and reflective plate 167 can be separate interlocking components at an interlocking junction 173. This is an example of modularity of construction allowing for the replacement or maintenance of either piece leading to reduced cost. In other embodiments, a force member 165 and reflective plate 167 can be one continuous component.

Figure 11C:
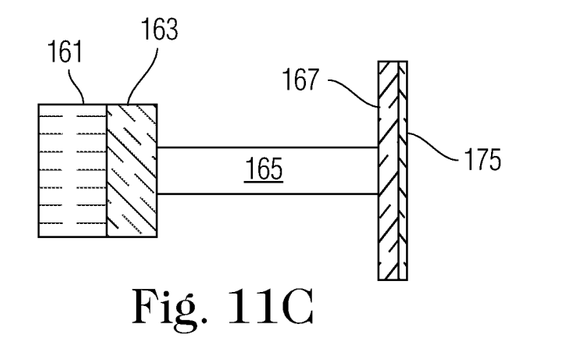
FIG. 11C shows a cross-sectional side view of a force sensing system.

FIG. 11C shows an exemplary radiation pressure system. A reflective plate 167 can include a plate 177 and coating 175. The reflective plate 167 connects to the force member 165 which, in turn, is in contact with an insulating layer 163. An insulating layer 163 (e.g., polypropylene or ceramics) can thermally isolate the PT 161 from heat coming from the force member 165.

Figure 11D:
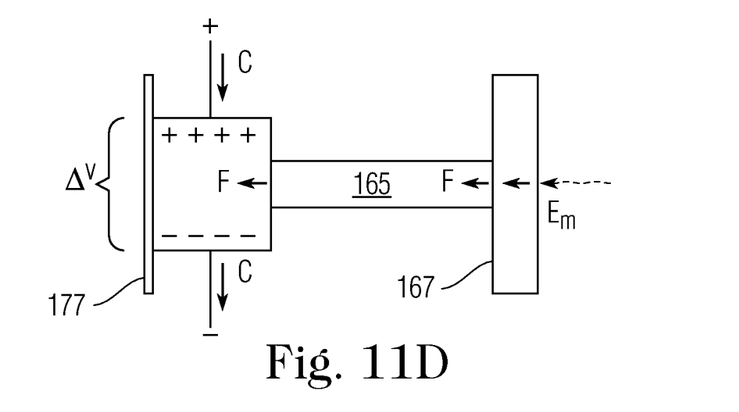
FIG. 11D shows an illustration of the principle of operation of an exemplary force sensing system.

FIG. 11D shows an exemplary radiation pressure system and the principle of operation. An EM beam 103 can impinge upon a reflective plate 167. The EM beam 103 reflecting off of the reflective plate 167 creates radiation pressure on the reflective plate 167 which can induce a force on the reflective plate 167 and subsequently a force member 165. The force member 165 can then transfer this force to the PT 161. The PT 161 registers a mechanical stress which can induce a voltage difference across the PT 161 to induce an electric current. The induced current, or equivalently the voltage difference, can be used to calculate the EM beam's 103 power. Moreover, the PT 161 can be used to generate counter forces, if need be (e.g., dampen vibrations); the system controller 11 can inject a current or, equivalently, induce a voltage difference across the PT 161, whereby it expands outwards (counter force).

Figure 12:
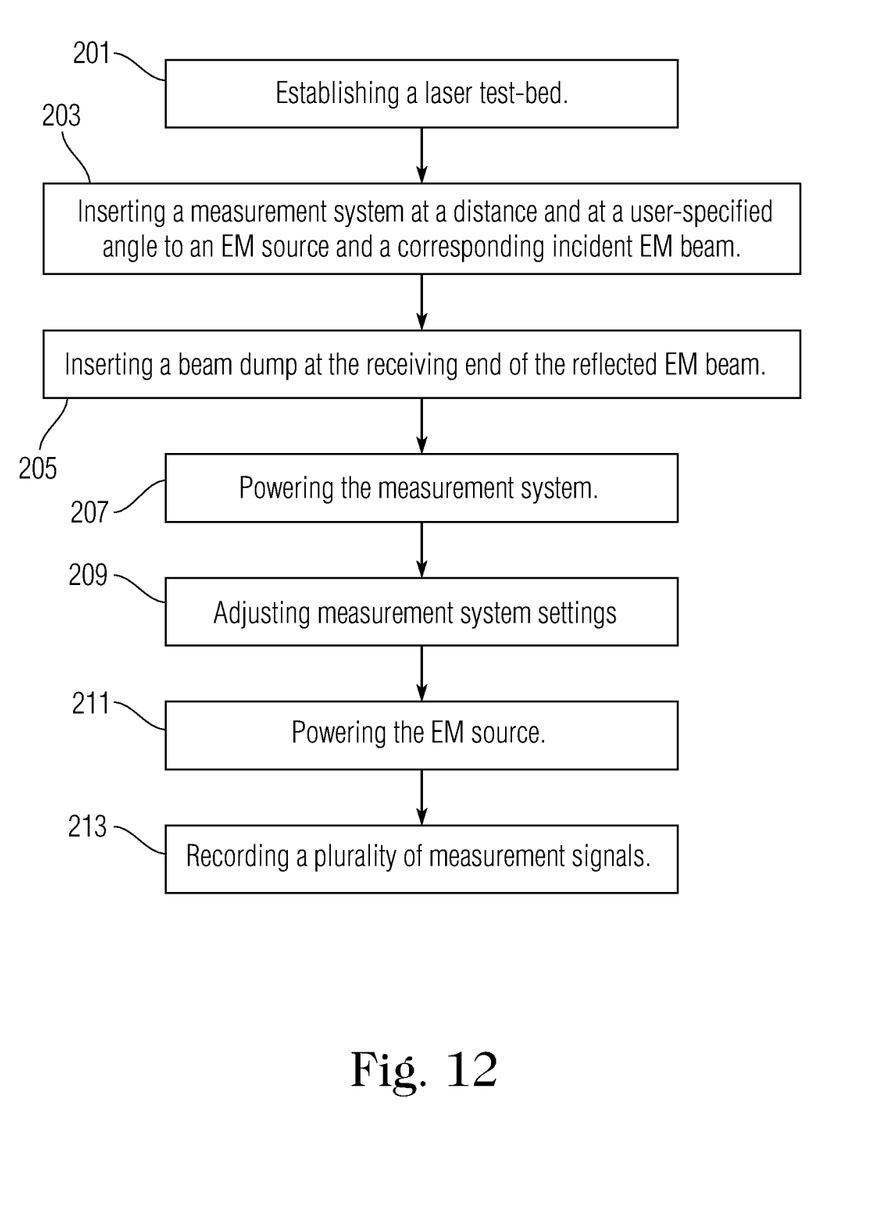
FIG. 12 shows an exemplary method of measuring EM beams.

FIG. 12 shows an exemplary method of measuring EM beams 103. At step 201, establishing a laser test-bed. At step 203, inserting a measurement system at a distance and at a user-specified angle to an EM source and a corresponding incident EM beam. At step 205, inserting a beam dump at the receiving end of the reflected EM beam. At step 207, powering the measurement system. At step 209, adjusting measurement system settings (e.g., change frequency of data recording or change power output units). Adjustments to settings can be made manually or remotely through an I/O system. At step 211, powering the EM source. At step 213, recording a plurality of measurement signals.

Although the invention has been described in detail with reference to certain preferred embodiments, variations and modifications exist within the spirit and scope of the invention as described and defined in the following claims.

The invention claimed is:

1. A high energy power measurement system comprising:
a case having an outer wall and an inner wall, wherein the inner wall forms a cavity within the case and at least one aperture dividing an inside and outside of the case;
an energy sensor system coupled to the case;

a temperature sensing system coupled to the case comprising at least one temperature sensor and a climate control system;

a vibration sensing system coupled to the case comprising at least one vibration sensor and a vibration control system;

at least one vibration dampener coupled to a bottom side of the case, wherein the case is configured such that directed electromagnetic radiation (EMR) entering the at least one aperture impacts the energy sensor system, wherein at least a first portion of the directed EMR reflects off of the energy sensor system and exits the case through the at least one aperture.

2. The high energy power measurement system of claim 1:

wherein the energy sensor system comprises a piezoelectric transducer and a plate assembly comprising a reflective plate;

wherein the plate assembly is coupled to the piezoelectric transducer such that forces acting upon the reflective plate are transferred to the piezoelectric transducer, wherein when forces are transferred to the piezoelectric transducer, the piezoelectric transducer generates a voltage;

wherein the directed EMR impacting the energy sensor system impacts the reflective plate;

wherein radiation pressure of the directed EMR impacting the reflective plate creates a force upon the reflective plate.

3. The high energy power measurement system of claim 2, further comprising:

a system controller comprising:
a processor, and
a power supply;
a graphical display unit;

wherein the system controller is electronically coupled to and controls the temperature sensing system and the vibration sensing system wherein the system controller is electronically coupled to the energy sensor system to allow the system controller to record the voltage generated by the piezoelectric transducer and calculate a power level of a source of the directed EMR based on the voltage.

4. The high energy power measurement system of claim 3 further comprising:

a graphical display unit;

wherein the system controller is electronically coupled to and controls the graphical display unit;

wherein the graphical display unit is configured to display the power level.

5. The high energy power measurement system of claim 2:

the plate assembly further comprising a force member and a plurality of fins, wherein the force member is coupled to the piezoelectric transducer and the plurality of fins are coupled to the force member.

6. The high energy power measurement system of claim 1, further comprising:

a case having an outer wall and an inner wall, wherein the inner wall forms a cavity within the case and at least one aperture dividing an inside and outside of the case;

an energy sensor system comprising a torque sensor coupled to the inner wall, an ellipsoid, and a stabilizing rod fixedly attached to a first central axis of the ellipsoid, wherein a first end of the stabilizing rod is rotatably coupled to the torque sensor and a second end of the stabilizing rod is rotatably coupled to the inner wall;

wherein the directed EMR impacting the energy sensor system impacts the ellipsoid;

wherein radiation pressure of the directed EMR impacting the ellipsoid creates a torque upon the ellipsoid which causes the ellipsoid and stabilizing rod to rotate;

wherein the torque sensor is configured to detect rotation of the stabilizing rod and measure the torque.

7. The high energy power measurement system of claim 6, further comprising:

a system controller comprising:
a processor, and
a power supply;
a graphical display unit;

wherein the system controller is electronically coupled to and controls the temperature sensing system and the vibration sensing system wherein the system controller is electronically coupled to the energy sensor system to allow the system controller to record the torque calculate a power level of a source of the directed EMR based on the torque.

8. The high energy power measurement system of claim 7 further comprising:

a graphical display unit;

wherein the system controller is electronically coupled to and controls the graphical display unit;

wherein the graphical display unit is configured to display the power level.

9. The high energy power measurement system of claim 6:

the case further comprising a heat absorbing shield coupled to the inner wall;

wherein a first region and a second region surround the ellipsoid, wherein the heat absorbing shield is positioned between the first region and an external directed EMR source to prevent the directed EMR from impacting the first region and allow the directed EMR to impact the second region.

10. The high energy power measurement system of claim 9:

the heat absorbing shield comprising an insulation layer, an absorption layer, and a plurality of fins, wherein the absorption layer faces the directed EMR source, wherein the insulation layer faces the ellipsoid, wherein the plurality of fins are coupled to the absorption layer.

11. A method of measuring directed electromagnetic radiation (EMR) comprising:

providing a high energy power measurement system comprising:

a case having an outer wall and an inner wall, wherein the inner wall forms a cavity within the case and at least one aperture dividing an inside and outside of the case;

an energy sensor system coupled to the case;

a temperature sensing system coupled to the case comprising at least one temperature sensor and a climate control system;

a vibration sensing system coupled to the case comprising at least one vibration sensor and a vibration control system;

at least one vibration dampener coupled to a bottom side of the case, wherein the case is configured such that directed electromagnetic radiation (EMR) entering the at least one aperture impacts the energy sensor system, wherein at least a first portion of the directed EMR reflects off of the energy sensor system and exits the case through the at least one aperture providing a directed EMR power source which produces the EMR;

providing the directed EMR power source and a beam dump;

aligning the directed EMR power source with the case such that the directed EMR will enter and exit the case through the at least one aperture;

inserting the beam dump at the receiving end of the reflected directed EMR such that the directed EMR enters the beam dump after exiting the case;

powering the power measurement system;

powering the EMR source;

recording a plurality of measurement signals generated by the energy sensor system.

* * * * *